Figure 1:
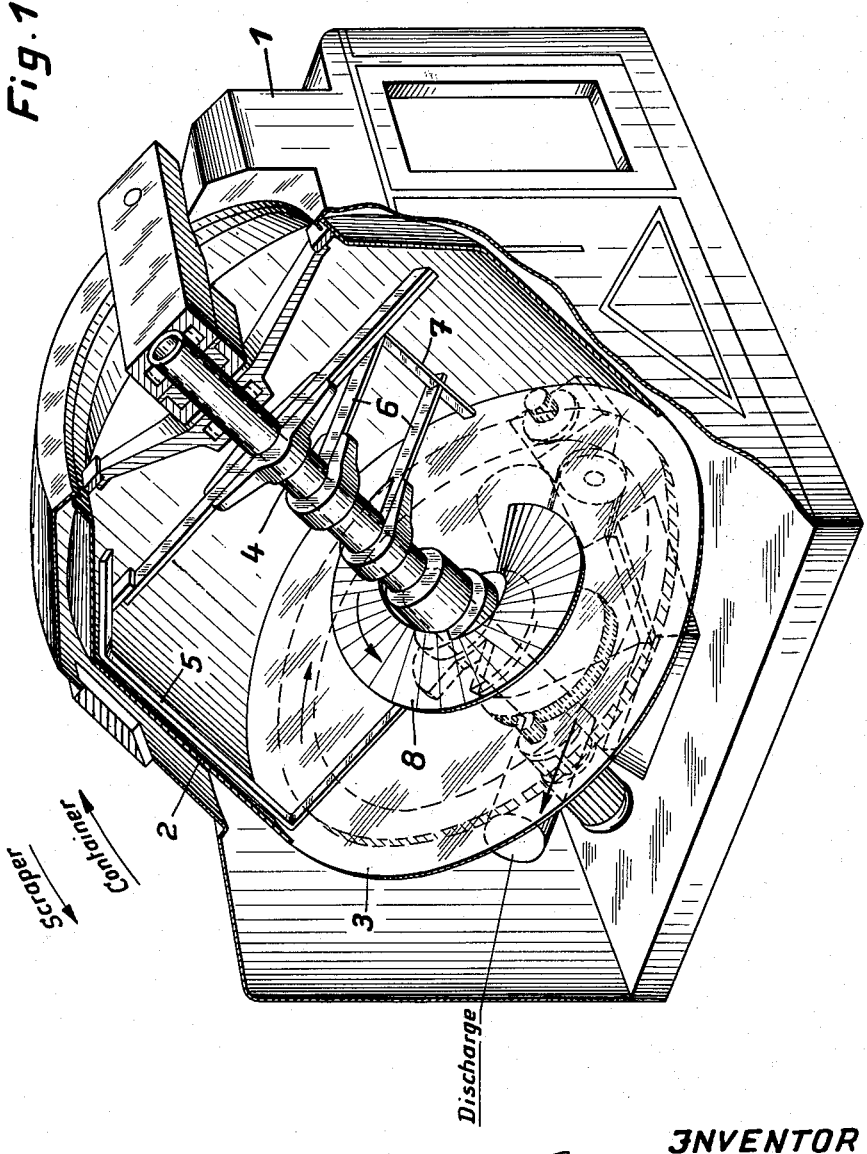

Dec. 31, 1963 G. HÜBNER 3,115,821
MACHINE FOR TREATING BULK CHOCOLATE
Filed Dec. 10, 1959 3 Sheets-Sheet 1

INVENTOR:
Gerhard Hübner
BY:
Beaman & Beaman

Dec. 31, 1963 G. HÜBNER 3,115,821
MACHINE FOR TREATING BULK CHOCOLATE
Filed Dec. 10, 1959 3 Sheets-Sheet 2

INVENTOR:
Gerhard Hübner
BY:
Beaman & Beaman

Dec. 31, 1963 G. HÜBNER 3,115,821
MACHINE FOR TREATING BULK CHOCOLATE
Filed Dec. 10, 1959 3 Sheets-Sheet 3

INVENTOR:
Gerhard Hübner
BY: Beaman & Beaman

United States Patent Office 3,115,821
Patented Dec. 31, 1963

3,115,821
MACHINE FOR TREATING BULK CHOCOLATE
Gerhard Hübner, Hamburg-Blankenese, Germany, assignor to Hermann Bauermeister, Maschinenfabrik und Muhlenbau G.m.b.H., Hamburg-Altona, Germany
Filed Dec. 10, 1959, Ser. No. 858,745
Claims priority, application Germany Jan. 24, 1959
7 Claims. (Cl. 99—236)

This invention relates to a machine for treating bulk chocolate comprising a rotating inclined cylindrical container, a central shaft extending therethrough carrying at least one scraper engaging the inner surface of said container for removing the chocolate being moved upwardly from the bulk sump and for returning it into said sump again in a closed curtain-like fashion, said container and said scraper being rotatably drivable in opposite directions.

The known machines of this type are charged with the bulk of chocolate to be treated having a crumble-like structure which is discharged from the machine in a finished form after having been treated for about 20 hours. During this treatment the bulk of chocolate is being vented and de-humidified, i.e. freed of water, in a known manner. The fat-content of the mass of chocolate amounts to about 25%. During the treatment the consistency of the mass is changing considerably. At the beginning, as already mentioned, it is in a dry crumbly state. While it shows this consistency the mass is taken along by the container and is removed from the container wall by the scraper arranged in the upper part of the inclined container, so that the dry mass is dropping downwardly in a sloping manner, due to the inclined arrangement of the container, then being moved upwardly again to be scraped-off again by the scraper which at this time is not yet rotated and in a position at its highest point. As the treatment advances lump-like configurations are formed from the mass tending to adhere and not to fall apart anymore which is disadvantageous in as much as by this phenomenon the entire process is delayed in an undesirable manner.

After the mass has passed this state it slowly but increasingly changes to a solid very hard paste which it is very difficult to disintegrate. Practice has shown that it is very difficult to overcome this state of the mass with the known machines.

The main object of this invention is the provision of a machine for processing a mass of chocolate by means of which the processing time may be shortened considerably without decreasing the quality of the finished product, said machine comprising a cylindrical container, the axis of which being inclined, means for driving said container to rotate about its inclined axis in one direction, a central shaft coaxially extending through said container and the bottom thereof, means for driving said central shaft in opposite direction to said container including means for selectively engaging or disengaging said drive connection of said central shaft, scraping means mounted on said central shaft engaging the inner surface of said container removing the mass of chocolate adhering thereto, disintegrating means carried by said central shaft and means connected with said central shaft conveying said mass of chocolate upwardly from the bottom of said container.

Another object of the invention is to provide disintegrating elements formed by at least one knife extending parallel to said central shaft, the knife being secured to arms extending radially from said drive shaft at a distance shorter than the radius of the scraping means.

Another object of the invention is to provide the arms holding the knife or knives with cutting edges so as to form additional knives. A further object of the invention is to set the knives to an angle of incidence to improve their cutting effect.

Still another object of the invention is to provide a screw conveyor mounted on the central shaft for conveying the mass of chocolate upwardly when the container is rotating.

A further object of the invention is to provide a screw conveyor extending axially up to about the height of the cake formed in the container the diameter of the screw conveyor being about ⅓ of the diameter of the container.

Another object of the invention is to provide a method of processing a mass of chocolate in which initially the mass having a crumbly form is filled into the rotating container while the scraper, the disintegrator and the screw conveyor are standing still the mass being worked upon in such a way that the material adhering to the wall of the container and the material conveyed upwardly by the screw conveyor is falling onto the knives thus being disintegrated, whereupon after the mass has attained a paste-like consistency the central shaft carrying the scraper, the knives and the screw conveyor are started to rotate in a counter direction to the container this processing step being continued until the mass has attained the desired final consistency and may be discharged.

Additional advantages and features of the invention will become evident from the following description in connection with the attached drawings and the claims.

One embodiment of the invention is shown in the drawings by way of example only to which the invention is not restricted as changes are possible without departing from the scope of the invention.

Figure 2:
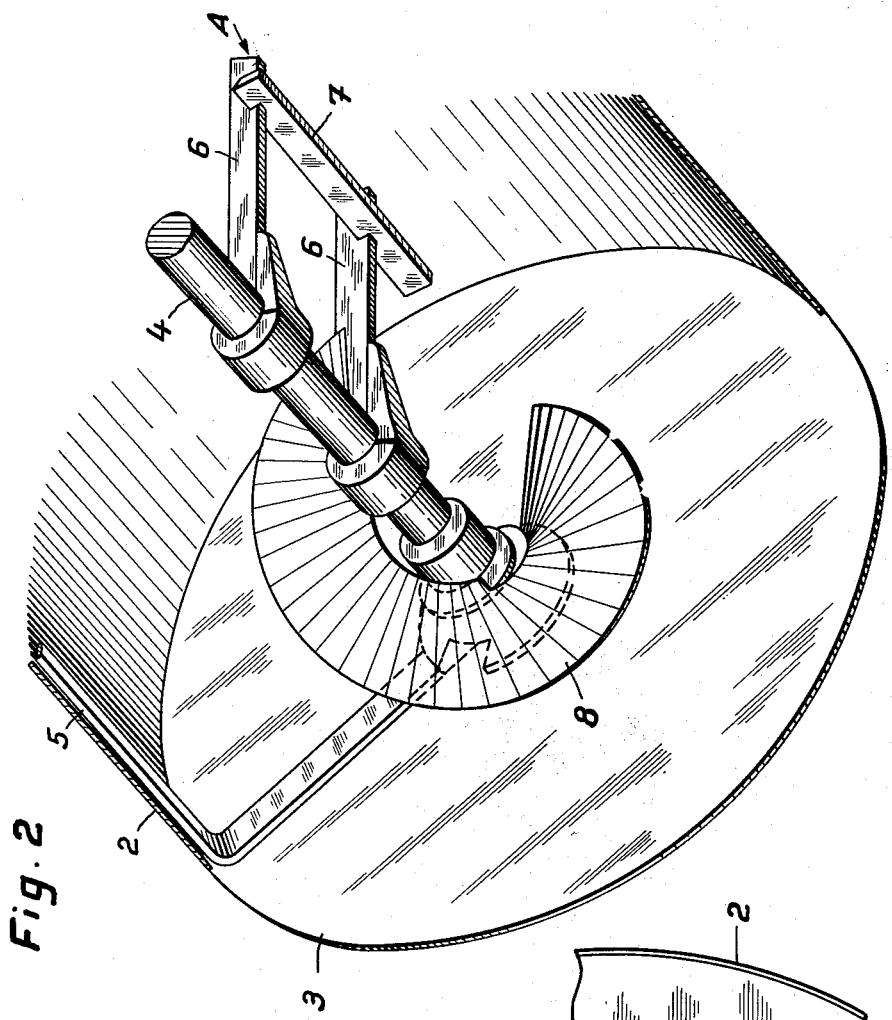
Figure 3:
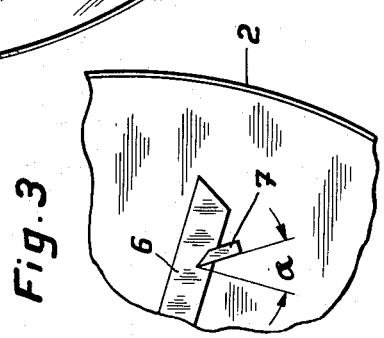
Figure 4:
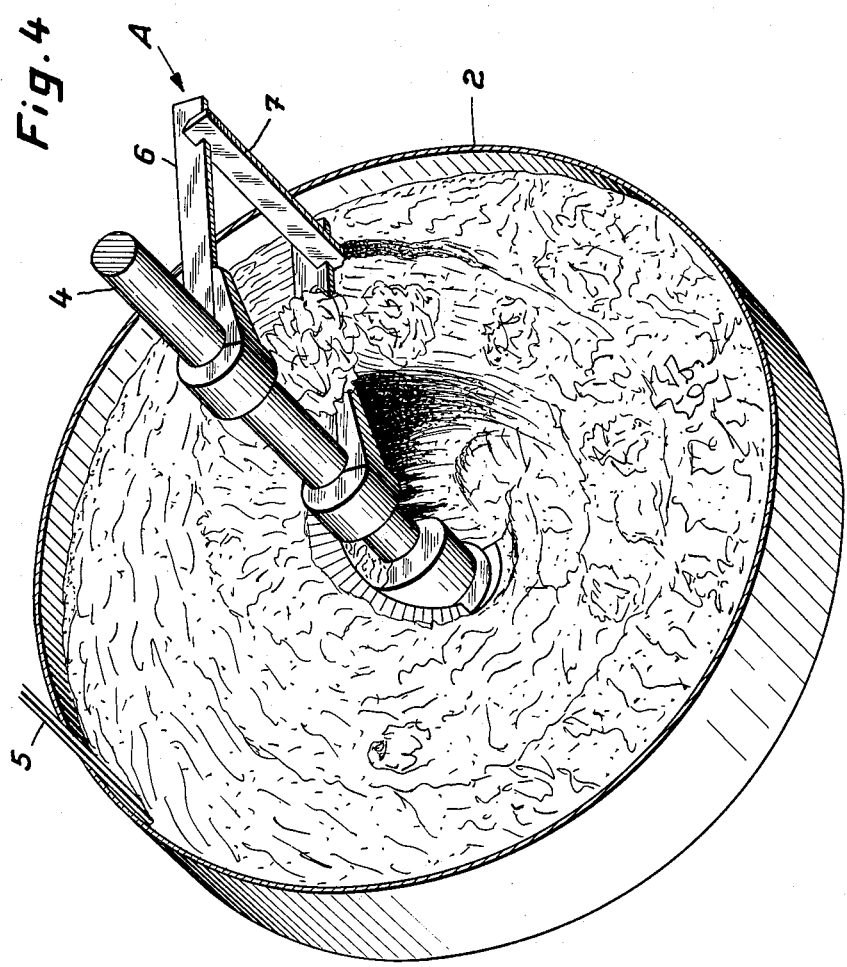

In the drawings:
FIG. 1 is a perspective view of a vertical section of the machine according to the invention,
FIG. 2 is a perspective view of the devices arranged within the container,
FIG. 3 is a partial plan view as seen in the direction of arrow A in FIG. 2,
FIG. 4 is a partial perspective view of the machine showing the mode of operation within the container.

In the drawings the machine, denoted as a whole with 1 comprises a cylindrical top open rotatable container 2 the axis of which being inclined about 45°. A drive pinion 9, driven from suitable motive means, engages a gear 10 affixed to the bottom of container 2 to rotate the same. Through the bottom 3 of the container 2 a shaft 4 extends which in a known manner is provided with a scraper 5 engaging the wall of the container 2. The drive of shaft 4 is designed in such a way that it is engageable or disengageable independent from the drive of the container 2, and includes a pinion 11, connected to a drive means 12, engaging the shaft-mounted gear 13. When rotating the shaft 4 rotates in a counterdirection to the container 2. The shaft 4 carries radially extending arms 6 supporting knives 7 parallelly spaced from the shaft 4 but being arranged on a radius which is smaller than that of the scraper 5. Preferably the knives 7 are set to an angle as shown in FIG. 3. The radially extending arms 6 carrying the knives 7 may also be formed with a cutting edge. The knives 7 are arranged on the shaft 4 and spaced radially relative to the scraper about approximately 120°.

Directly above the bottom 3 of the container 2 a screw conveyor 8 is mounted on the shaft 4 the pitch of which is chosen so that the mass contained within the container 2 is moved upwardly when the container is rotating no matter whether the drive of the shaft 4 is engaged or disengaged. Preferably the diameter of the screw conveyor amounts to about ⅓ of the diameter of the container and extends upwardly to about the height of the cake forming in the container.

The mode of operation of the machine is as follows:
The machine is charged with the bulk of chocolate in a dry crumbly state. Thereupon the container only is started moving, while the scraper arm is approximately in a position at the upper vertex of the container wall. The knives 7 are in a position inclined downwardly, and are forming an angle of about 120° with the scraper.

In this way an upward conveying effect of the rather solid mass is obtained by the screw conveyor in a direction of the inclination of the container. The solid adhering mass is thus moved upwardly in the center of the mass by the screw conveyor. It is moved radially out of the screw conveyor and thus enters the outer ring zone. Here the mass is taken along by the container wall, is removed from it by the scraper, and again drops partly by its own weight and partly by centrifugal force into the cavity forming between the scraper and the wall of the cake which then again is engaged by the screw conveyor at the bottom of the container. The mass is now being kneaded inwardly and downwardly where it again is engaged by the screw conveyor whereby the circuit is closed. While this procedure advances the mass is increasingly becoming more liquid until it finally attains a thickly liquid state. Now the counter rotation of the scraper is started, in which the scraper is so to say cutting off the mass from the wall of the container whereto the thickly liquid mass adheres and from which it is falling back in form of an uninterrupted blanket. This blanket which is formed by the mass drawn out from below is moving from one side to the other of the container due to the rotating motion of the scraper, and is finally thrown onto the surface of the mass in a closed formation.

What I claim is:

1. A machine for processing chocolate masses comprising, in combination, a container including an annular cylindrical side wall having an inner surface, a bottom and a top, means supporting said container for rotation about an axis inclined with respect to the vertical whereby a given portion of said side wall passes from a point of minimum elevation to a point of maximum elevation during each revolution of said container, first drive means drivingly associated with said container, a shaft extending into said container and coaxially related thereto, means rotatably supporting said shaft, selectively actuated second drive means drivingly associated with said shaft, scraper means mounted on said shaft disposed adjacent said container inner surface, disintegrating means supported on said shaft within said container and conveying means defined on said shaft adjacent the bottom of said container adapted to convey chocolate upwardly during relative rotation of said container and shaft, said conveying means terminating short of said container top whereby the chocolate conveyed thereby is redistributed within said container.

2. In a machine for processing chocolate masses as in claim 1, wherein said disintegration means includes a blade radially spaced from said shaft and having a portion extending toward said container bottom.

3. In a machine for processing chocolate masses as in claim 2, wherein radially extending arms are mounted upon said shaft, said blade being mounted upon said arms.

4. In a machine for processing chocolate masses as in claim 3, wherein said blade is of an elongated form and is disposed substantially parallel to said shaft.

5. In a machine for processing chocolate masses as in claim 1, wherein said conveying means comprises a screw conveyor.

6. In a machine for processing chocolate masses as in claim 5, wherein said screw conveyor is of a diameter substantially one-third of the diameter of said container.

7. A machine for processing chocolate masses comprising, in combination, a container including an annular side wall having an inner surface, a bottom and a top, means supporting said container for rotation about an axis inclined with respect to the vertical and horizontal whereby any given portion of said side wall passes from a point of minimum elevation to a point of maximum elevation during each revolution of said container, first drive means drivingly associated with said container, a scraper within said container having a scraping edge substantially engaging said side wall inner surface for removing chocolate adhering to said inner surface, scraper supporting means stationarily maintaining said scraper in said substantial engagement with said side wall inner surface adjacent the position of maximum side wall elevation whereby chocolate adhering to said side wall inner surface portion at the lower and minimum elevations of said side wall portion will be removed from said side wall portion inner surface upon passage of said portion through said point of maximum elevation thereof, and fall toward the bottom of said container.

References Cited in the file of this patent

UNITED STATES PATENTS

| | | |
|---|---|---|
| 1,336,878 | Aeschbach | Apr. 13, 1920 |
| 2,426,616 | Jones | Sept. 2, 1947 |
| 2,558,128 | Edwards | June 26, 1951 |
| 2,582,664 | Widen | Jan. 15, 1952 |
| 2,669,924 | Wiemer | Feb. 23, 1954 |
| 2,831,418 | Ponisch | Apr. 22, 1958 |

FOREIGN PATENTS

| | | |
|---|---|---|
| 1,031,141 | France | Mar. 18, 1953 |